United States Patent
Kintz et al.

[19]

[11] Patent Number: 5,959,781

[45] Date of Patent: Sep. 28, 1999

[54] OPTICAL METHOD EMPLOYING TOTAL INTERNAL REFLECTION

[75] Inventors: Gregory J. Kintz, Mountain View; Alfred P. Hildebrand, Palo Alto, both of Calif.

[73] Assignee: Inviso, Sunnyvale, Calif.

[21] Appl. No.: 09/237,996

[22] Filed: Jan. 26, 1999

Related U.S. Application Data

[63] Continuation of application No. 09/033,208, Mar. 2, 1998, Pat. No. 5,892,624, which is a continuation of application No. 08/673,894, Jul. 2, 1996, Pat. No. 5,771,124.

[51] Int. Cl.$^6$ .................................................. G02B 27/14
[52] U.S. Cl. .......................... 359/637; 359/633; 359/629; 359/364
[58] Field of Search .................................. 359/637, 633, 359/630, 631, 629, 639, 364

[56] References Cited

U.S. PATENT DOCUMENTS

| | | | |
|---|---|---|---|
| 3,296,509 | 1/1967 | Katchman | 317/258 |
| 3,758,196 | 9/1973 | Weiss | 359/629 |
| 4,082,440 | 4/1978 | Bennett | 353/26 |
| 4,099,831 | 7/1978 | Freeman . | |
| 4,361,384 | 11/1982 | Bosserman . | |
| 4,717,248 | 1/1988 | LaRussa | 359/618 |
| 4,728,185 | 3/1988 | Thomas | 353/122 |
| 4,832,427 | 5/1989 | Nanba et al. . | |
| 4,859,031 | 8/1989 | Berman et al. | 349/11 |
| 4,900,133 | 2/1990 | Berman et al. | 349/11 |
| 4,925,272 | 5/1990 | Ohshima et al. . | |

(List continued on next page.)

FOREIGN PATENT DOCUMENTS

| | | | |
|---|---|---|---|
| 0351967 | 1/1990 | European Pat. Off. | G02B 27/00 |
| 0566000A1 | 4/1993 | European Pat. Off. | G02B 27/00 |
| 0566001A2 | 4/1993 | European Pat. Off. | G02B 27/00 |

(List continued on next page.)

OTHER PUBLICATIONS

Handbook of Optics, vol. I, Fundamentals, Techniques and Design, 2nd Edition, McGraw–Hill, Inc., Chapt. 30.4, 30.5.
Frank L. Pedrotti, S.J., Introduction to Optics, Prentice Hall, pp. 50, 52–53, 140.
Frank L. Pedrotti, S.J., Introduction to Optics, Prentice Hall, pp. 137–8.
Frank L. Pedrotti, S.J., Introduction to Optics, Prentice Hall, pp. 522 and 528–530.
Frank L. Pedrotti, S.J., Introduction to Optics, Prentice Hall, Chapt. 5, "Aberation Theory".
B.E.A. Saleh and M.C. Teich, Fundatmentals of Photonics, John Wiley and Sons, pp. 135–139.
Young, "Head–Mounted Display", IBM Technical Disclosure Bulletin, vol. 25, No. 12 pp. 6373–6374, (May 1983).

*Primary Examiner*—Loha Ben
*Attorney, Agent, or Firm*—David J. Weitz; Wilson Sonsini Goodrich & Rosati

[57] ABSTRACT

A virtual image display system is provided which is made thinner through the use of an immersed beam splitter, and in one embodiment, total internal reflection. The display system includes an imaging surface on which a source object is formed, a first optical element having a reflective function and a magnification function, a second optical element having a magnification function and an immersed beam splitting element positioned between the first and second optical elements, the immersed beam splitting element including a beam splitter surrounded by an optically transparent material having a refractive index greater than air. An illumination source projects the source object formed at the imaging surface through the optically transparent material to the beam splitter. The beam splitter reflects the projected source object to the first optical element. The first optical element magnifies the projected source object and reflects a magnified virtual image of the projected source object to the beam splitter. The magnified virtual image traverses the beam splitter to the second optical element which magnifies the magnified virtual image to produce a compound magnified virtual image of the source object.

14 Claims, 12 Drawing Sheets

U.S. PATENT DOCUMENTS

| | | | |
|---|---|---|---|
| 4,999,012 | 3/1991 | Suzuki et al. | 353/14 |
| 5,050,966 | 9/1991 | Berman et al. | 359/38 |
| 5,087,119 | 2/1992 | Taylor, II et al. | 359/851 |
| 5,121,099 | 6/1992 | Hegg et al. | 340/461 |
| 5,157,503 | 10/1992 | Dugdale | 358/238 |
| 5,189,512 | 2/1993 | Cameron et al. | 358/93 |
| 5,224,198 | 6/1993 | Jachimowicz et al. | 385/133 |
| 5,291,338 | 3/1994 | Bezard et al. | 359/859 |
| 5,303,085 | 4/1994 | Rallison | 359/631 |
| 5,305,124 | 4/1994 | Chern et al. | 359/13 |
| 5,323,477 | 6/1994 | Lebby et al. | 385/129 |
| 5,334,991 | 8/1994 | Wells et al. | 345/8 |
| 5,351,151 | 9/1994 | Levy | 359/240 |
| 5,357,372 | 10/1994 | Chen et al. | 359/637 |
| 5,369,415 | 11/1994 | Richard et al. | 345/6 |
| 5,383,053 | 1/1995 | Hegg et al. | 359/486 |
| 5,386,216 | 1/1995 | Iino | 345/7 |
| 5,394,203 | 2/1995 | Murphy et al. | 353/13 |
| 5,418,584 | 5/1995 | Larson | 353/122 |
| 5,422,653 | 6/1995 | Maguire, Jr. | 345/9 |
| 5,422,758 | 6/1995 | Lawson | 359/634 |
| 5,426,521 | 6/1995 | Chen et al. | 359/9 |
| 5,467,104 | 11/1995 | Furness, III et al. | 345/8 |
| 5,467,205 | 11/1995 | Kuba et al. | 359/40 |
| 5,467,215 | 11/1995 | Lebby et al. | 359/247 |
| 5,479,224 | 12/1995 | Yasugaki et al. | 353/101 |
| 5,483,307 | 1/1996 | Anderson | 353/98 |
| 5,485,318 | 1/1996 | Lebby et al. | 359/811 |
| 5,486,946 | 1/1996 | Jachimowicz et al. | 359/263 |
| 5,491,491 | 2/1996 | Lebby et al. | 345/7 |
| 5,499,138 | 3/1996 | Iba | 359/569 |
| 5,506,595 | 4/1996 | Fukano et al. | 345/7 |
| 5,506,728 | 4/1996 | Edwards et al. | 359/629 |
| 5,519,536 | 5/1996 | Hoehn | 359/630 |
| 5,526,191 | 6/1996 | Nishii et al. | 359/757 |
| 5,530,586 | 6/1996 | Yasugaki | 359/364 |
| 5,537,260 | 7/1996 | Williamson | 359/727 |
| 5,539,422 | 7/1996 | Heacock et al. | 345/8 |
| 5,539,554 | 7/1996 | Lebby et al. | 359/83 |
| 5,539,578 | 7/1996 | Togino et al. | 359/630 |
| 5,543,958 | 8/1996 | Lebby et al. | 359/630 |
| 5,546,227 | 8/1996 | Yasugaki et al. | 359/630 |
| 5,552,934 | 9/1996 | Prince | 359/629 |
| 5,552,943 | 9/1996 | Hirano et al. | 360/69 |
| 5,557,353 | 9/1996 | Stahl | 353/69 |
| 5,579,161 | 11/1996 | Sekiguchi | 359/559 |
| 5,587,836 | 12/1996 | Takahashi et al. | 359/630 |
| 5,596,433 | 1/1997 | Konuma | 359/637 |
| 5,612,549 | 3/1997 | Nelson et al. | 257/88 |
| 5,619,377 | 4/1997 | Rallison | 359/631 |
| 5,627,678 | 5/1997 | Nishii et al. | 359/561 |
| 5,638,218 | 6/1997 | Oomura | 359/727 |
| 5,654,827 | 8/1997 | Reichert | 359/631 |
| 5,659,430 | 8/1997 | Togino | 359/731 |
| 5,661,604 | 8/1997 | Kuba | 359/637 |

FOREIGN PATENT DOCUMENTS

| | | | |
|---|---|---|---|
| 0566002A1 | 4/1993 | European Pat. Off. | G02B 27/00 |
| 2 004 383 A | 3/1979 | United Kingdom | G02B 27/28 |
| 2 182 456 A | 9/1983 | United Kingdom | G02B 27/00 |

OPTICAL METHOD EMPLOYING TOTAL INTERNAL REFLECTION

This application is a continuation of application Ser. No. 09/033,208, filed Mar. 2, 1998, now U.S. Pat. No. 5,892,624, which is a continuation of application Ser. No. 08/673,894, filed Jul. 2, 1996, now U.S. Pat. No. 5,771,124, which applications are incorporated herein by reference in their entirety.

BACKGROUND OF THE INVENTION

1. Field of the Invention

The invention generally relates to a compact electronic display system. More specifically, the invention relates to a compact electronic display system which provides a compound magnified virtual image of a source object using two stages of magnification.

2. Description of Related Art

A continuing objective in the field of electronics is the miniaturization of electronic devices. Most electronic devices include some form of display system which provides information to the user. As electronic devices are reduced in size, display systems are needed which can be incorporated into the increasingly smaller devices. It is thus important that the space required to house these display systems be reduced. In particular, it is desirable that the thickness of the display system be reduced, the thickness of the display referring to the dimension of the display system which is perpendicular to the plane of the image formed by the display.

In general, the image provided by an electronic display may be either a real image or a virtual image. One approach to reducing the size of a display system is through the formation of a virtual image instead of a real image.

A real image refers to an image which is observed directly by the unaided human eye. A real image exists at a given location when a real image can be observed by the unaided eye if a viewing surface is positioned at the location. A photograph is an example of a real image. Examples of electronic displays which provide real images include liquid crystal displays, CRT monitors, and projection screens. Compact electronic devices, because of their small size, have a limited surface area on which to provide a real image. Since the amount of detail that the human eye can resolve per unit area is limited, devices which provide a real image are only able to provide a limited amount of legible information per display screen.

By contrast to real image displays, virtual image displays provide a virtual image, i.e., an image which, if a viewing surface were positioned at the location of the virtual image, no image would be observed by the eye. By definition, a virtual image can exist at a location where no display surface exists. An example of a virtual image is the image of fine print viewed through a magnifying glass.

Virtual image displays provide an image which appears to be larger than the source object from which the virtual image is formed. As a result, the size of the virtual image, as perceived by the user, is limited by the magnification of the display system as opposed to the size of the electronic display. This enables virtual image displays to provide the user with a greater amount of legible information per display screen than real image displays in the same space. It also enables a virtual image display to be designed which provides the same amount of information per screen as real image displays in a smaller space.

In general, virtual image displays include a source object which is magnified by one or more optics to provide a virtual image along an image plane. The thickness of the display, i.e., the dimension of the display that is perpendicular to the image plane of the virtual image, is dependent on the separation between the components of the display system. A need exists for an inexpensive, compact virtual image display system in which the separation between the components of the display system are reduced so that the display system has a reduced thickness.

There are at least four parameters which relate to the ease of viewing an image produced by a virtual image display. The first parameter is the far point which refers to the maximum distance from the eye that a display system can be held and have the eye still see the entire virtual image. Display systems which provide a far point which is a short distance from the display are undesirable due to the inconvenience and discomfort associated with placing the eye in close proximity with the display. A need therefore exists for a virtual image display system which provides a sufficiently long far point so that the magnified image can be viewed at a comfortable and convenient range of distances from the display system.

The second parameter relating to the ease of viewing a virtual image is the apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface. A need exists for a virtual image display system which provides a wide field of view.

The third parameter relating to the ease of viewing a virtual image is the transverse distance that the eye may move with respect to the optical system and still have the eye see the entire virtual image through the display system. A need exists for a virtual image display system which provides a long transverse distance through which the eye may move with respect to the display system.

The fourth parameter relating to the ease of viewing a virtual image is illumination. In this regard, it is important that the virtual image produced be have a strong contrast ratio between illuminated and non-illuminated pixels. A need therefore exists for a display system which provides a bright virtual image. A further difficulty associated with virtual image displays is irregularities in the illumination of the source object. A need therefore also exists for a display system which provides a virtual image having substantially uniform illumination across the image.

SUMMARY OF THE INVENTION

A compact virtual image display system is provided which has a reduced thickness, (the dimension perpendicular to the image plane of the virtual image) without significantly reducing the field of view or eye relief provided by the display system. Reducing the thickness of the display system is accomplished using an immersed beam splitter, and in one embodiment, total internal reflection within the immersed bean splitter. In one embodiment, the display system produces a virtual image with enhanced brightness. In another embodiment, the display system includes at least one optic whose position is adjustable. Movement of the optic serves to focus the display system, thereby enabling the display system to be used by a wide variety of users. Due to the design of the display system, only a very small adjustment in the positioning of one of the optics is needed in order to focus the display system.

According to the present invention, the display system includes an imaging surface on which a source object is produced, a first optical element having a reflective function and a magnification function, a second optical element having a magnification function and an immersed beam splitting element positioned between the first and second optical elements, the immersed beam splitting element including a beam splitter surrounded by one or more optically transparent materials having a refractive index greater than air. An illumination source projects light onto the imaging surface to cause the source object to be projected through the optically transparent material to the beam splitter. The beam splitter reflects the projected source object to the first optical element. The magnification function of the first optical element magnifies the projected source object and the reflection function reflects a magnified first virtual image of the projected source object to the beam splitter. The magnified first virtual image then traverses the beam splitter and enters the second optical element which magnifies the first magnified virtual image to produce a compound magnified virtual image of the source object.

In one embodiment, the beam splitter and first optical element have reflective surfaces, the angle between the reflective surfaces of the beam splitter and the first optical element being between about 30 and 45°, in another embodiment, 37°.

In one embodiment, the immersed beam splitting element has a back surface facing the first optical element which causes light directed to the back surface to be totally internally reflected within the optically transparent material when the angle of incidence of the light relative to the back surface is less than an angle θ. According to this embodiment, the source object is projected from the imaging surface to the back surface of the immersed beam splitting element at less than ail angle θ such that the back surface reflects the light to the beam splitter. By using total internal reflection in this manner, the angle between the reflective surfaces of the beam splitter and first optical element can be reduced to between about 10 and 30°. This enables the overall thickness of the display system to be reduced.

In one embodiment, the optically transparent material used in the immersed beam splitter has a refractive index of at least about 1.3. Examples of optically transparent materials include, but are not limited to glass and plastics such as polymethyl methacrylate, polystyrene, polycarbonate, methyl methacrylate styrene, styrene acrylonitrile, and acrylonitrile butadiene styrene.

A polarization modifier may be used to improve the light efficiency of the display. According to this embodiment, the beam splitter is reflective to a first polarization of light and transmissive to a second polarization of light. In this embodiment, the light projected to the beam splitter is of a first polarization. In this embodiment, the display system also includes a polarization modifier positioned between the beam splitter and the first optical element such that light traverses the polarization modifier after being reflected by the beam splitter and after being reflected by the first optical element. The polarization modifier alters the light from a first polarization to a second polarization so that the magnified first virtual image reflected by the first optical element traverses the beam splitter. In one embodiment, the polarization modifier is a quarter waveplate.

The imaging surface may be any surface on which a source object can be formed. For example, the imaging surface may be a microdisplay, i.e. an electronically activated display which can produce a source object of any type. Examples of microdisplays include, but are not limited to liquid crystal displays, spatial light modulators, gratings, mirror light valves and LED and FED arrays. In one embodiment, the microdisplay has a display area of less than about 100 mm$^2$. The microdisplay generally includes an array of pixels which form a source object. In one embodiment, the pixels have an area between about 49 $\mu$m$^2$ and about 225 $\mu$m$^2$, in another embodiment, less than about 144 $\mu$m$^2$.

The imaging surface may also be a surface on which an image is projected. For example, the imaging surface may be a light transmissive or reflective screen on which a real image serving as the source object can be formed.

In one embodiment, a brighter display system is provided which includes a microdisplay having an array of pixels which can be modulated to either reflect or scatter light and an optical grating which focuses light scattered by the microdisplay onto the immersed beam splitting element so that more of the scattered light is transmitted through the optics to the user.

In a preferred embodiment, the display system also includes an eye position sensor for detecting the distance of a user's eye to the display system. The eye position sensor provides a signal to the light type controlling mechanism which instructs the controlling mechanism as to the type of light to project to the light differentiating element. The eye position sensor may also be employed by the user to interact with the display system, i.e., control the types of source objects formed on the imaging surface as well as the operation of the device housing the display system.

BRIEF DESCRIPTION OF THE DRAWINGS

FIG. 5A illustrates an immersed beam splitting element in which the surface of the immersed beam splitting element which faces the first optical element is covered by a glass slide.

FIG. 5B illustrates an immersed beam splitting element in which the surface of the immersed beam splitting element which faces the second optical element is covered by a glass slide.

FIG. 5C illustrates an immersed beam splitting element in which the surface of the immersed beam splitting element which faces the first optical element is covered by a glass slide within which a beam splitter has been incorporated.

FIG. 5D illustrates an immersed beam splitting element in which the entire surface of the element is covered by glass.

DESCRIPTION OF THE PREFERRED EMBODIMENTS

A virtual image display system is provided in which the thickness of the display system is reduced, the thickness of the display referring to the dimension of the display perpendicular to the plane of the virtual image. Reducing the thickness of the display system is accomplished according to the present invention using an immersed beam splitter, and in one embodiment, total internal reflection within the immersed beam splitter. According to the present invention, the thickness of the display system is reduced without altering the other ergonomics of the display system, i.e., without reducing the field of view or eye relief provided by the display system. In one embodiment, a display system is provided which also produces a virtual image with enhanced brightness. In another embodiment, the display system includes at least one optic whose position is adjustable. Movement of the optic serves to focus the display system, thereby enabling the display system to be used by a wide variety of users. Due to the design of the display system, only a very small adjustment in the positioning of one of the optics is needed in order to focus the display system.

The display system of the present invention is intended as an inexpensive component which may be incorporated into any electronic device in which a display system is used. In one embodiment, the display system is designed for use in pocket-sized electronic devices. Examples of such devices include, but are not limited to, portable computers, personal communicators, personal digital assistants, modems, pagers, video and camera viewfinders, mobile phones, television monitors and other hand held devices.

Figure 1:
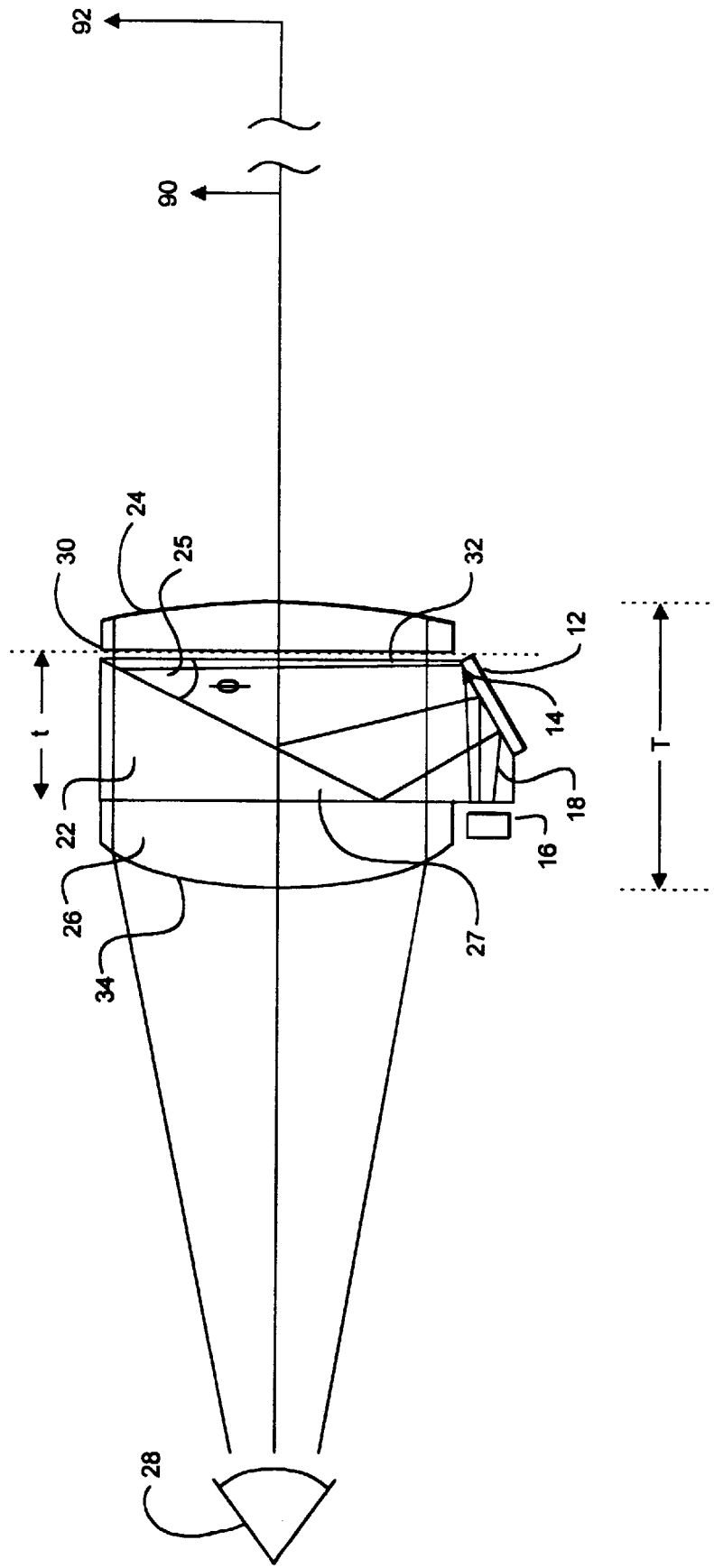
FIG. 1 illustrates a display system in which an immersed beam splitter is used.

An embodiment of the display system of the present invention is illustrated in FIG. 1. As illustrated in the figure, the display system 10 includes an imaging surface 12 on which a source object 14 is formed. In FIG. 1, the imaging surface 12 illustrated is a microdisplay which forms the source object. Alternate embodiments of the imaging surface are described herein.

Light 18 from an illumination source 16 is projected onto the imaging surface 12 to cause the source object to be projected into an immersed beam splitting element 22 which includes a beam splitter 25 immersed in an optically transparent material 27. A portion of the light which reaches the beam splitter 25 is reflected by the beam splitter 25 and directed to first optical element 24.

First optical element 24 has a reflective function and a magnification function. The image formed by the light projected onto the first optical element 24 is magnified by the magnification function of the element to form a magnified first virtual image 90. The light from the magnified first virtual image 90 is reflected by the reflective function of the element. At least a portion of the light forming the magnified first virtual image 90 passes through the beam splitting element 22 to a second optical element 26. The magnified first virtual image 90 projected onto second optical element 26 is magnified by the second optical element 26 as the light traverses the second optical element 26 to form a compound magnified virtual image 92 which is seen by observer 28. The apparent position of the first magnified virtual image 90 relative to the second optical element is approximately equal to or less than the focal length of the second optical element 26. The compound magnified virtual image 92 appears to be positioned further away than the first magnified virtual image 90, preferably at least 10 inches away. In one embodiment the compound magnified virtual image 92 is at least about 6 feet away to provide for comfortable viewing.

In order to prevent stray light from interfering with the observer's ability to see the compound virtual image 92, in one embodiment, an antireflective coating is placed on the outside surface 34 of the second optical element 26.

Figure 2:
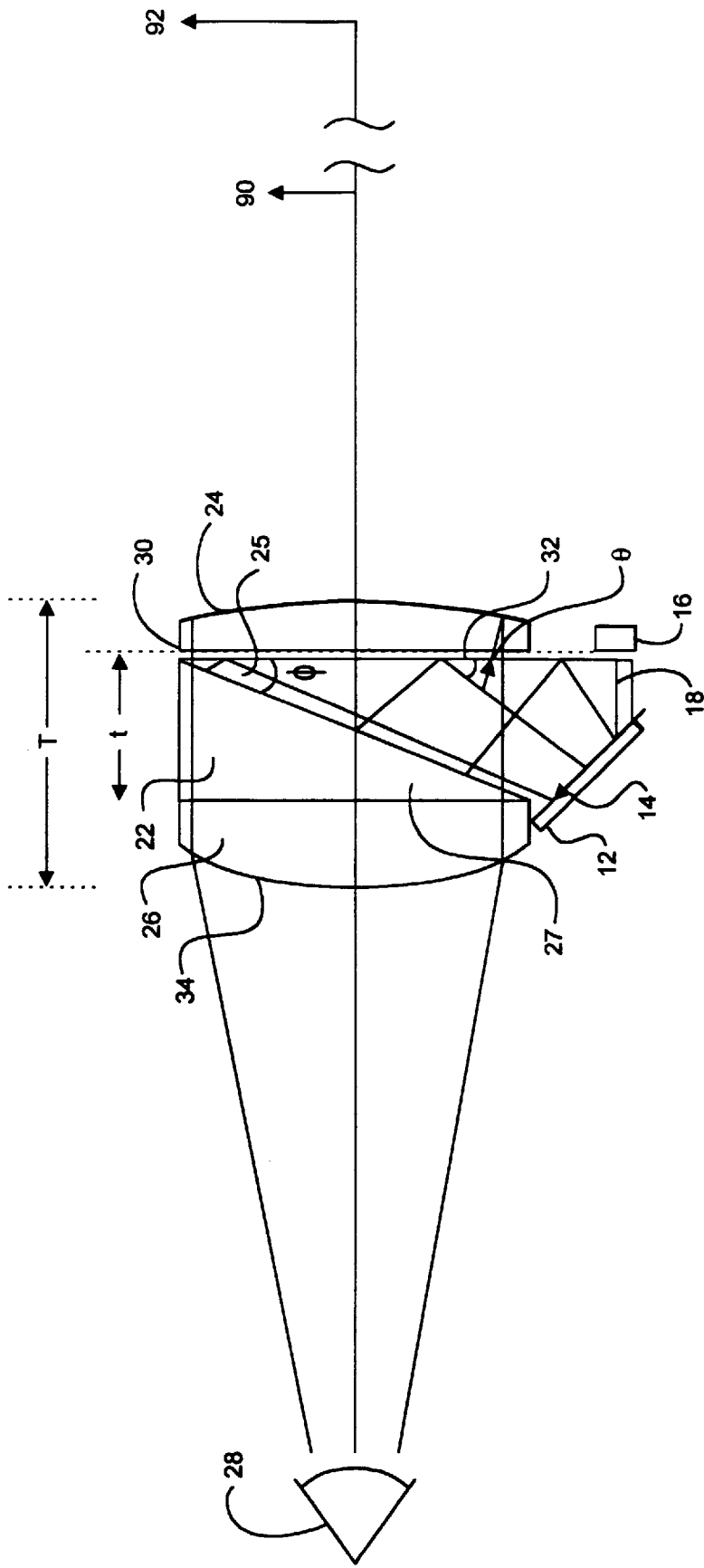
FIG. 2 illustrates a display system according to the present invention in which total internal reflection off of the rear surface of the beam splitting element is used to reduce the size of the display system.

FIG. 2 illustrates an alternate embodiment of the display system in which total internal reflection off the back surface 32 of the beam splitting element 22 is used to further reduce the thickness of the display. As illustrated in the figure, the display system 10 includes an imaging surface 12 on which a source object 14 is formed. Illumination source 16 projects light 18 onto the imaging surface 12.

The light 18 projected onto the imaging surface 12 causes the source object to be projected toward the back surface 32 of beam splitting element 22. By angling the imaging surface 12 such that the light corresponding to the projected source object contacts the back surface 32 of the beam splitting element 22 at an angle θ less than the angle at which total internal reflection occurs, the light forming the projected source object is reflected off the back surface 32 of the beam splitting element 22 to beam splitter 25. The light is then reflected by the beam splitter 25 and directed to first optical element 24.

The angle θ at which total internal reflection occurs depends on the refractive inidex material 27 used to form the immersed beam splitting element 22, as well as whether a film is placed on the back surface 32 of the beam splitting element 22. In one embodiment, angle θ is less than about 60.

As in the embodiment illustrated in FIG. 1, first optical element 24 has a reflective function and a magnification function. The image formed by the light projected onto first optical element 24 is magnified by the magnification function of the element to form a magnified first virtual image 90. The light from the magnified first virtual image 90 is reflected by the reflective function of the element. At least a portion of the light forming the magnified first virtual image 90 passes through the beam splitting element 22 to a second optical element 26. The magnified first virtual image 90 formed by the light projected onto second optical element 26 is magnified by the second optical element 26 as the light traverses the second optical element 26 and is seen as a compound magnified virtual image 92 by the observer 28.

As illustrated in FIGS. 1 and 2, the beam splitter 25 is positioned relative to the plane 30 of the first optical element 24 to direct light from the imaging surface 12 onto the first optical element 24. The apparent position of the first magnified virtual image relative to the second optical element is approximately equal to or less than the focal length of the second optical element. The compound magnified virtual image 92 appears to be positioned further away than the first magnified virtual image 90, preferably at least 10 inches away. In one embodiment the compound magnified image 92 is at least about 6 feet away to provide for comfortable viewing.

The angle φ between the beam splitter 25 and plane 30 limits how close the first and second optical elements 24, 26 may be positioned relative to each other (shown in FIGS. 1 and 2 as distance t) and hence limits the overall thickness T of the display system.

According to the present invention, the separation required between the first and second optical elements 24, 26 is reduced by using immersed beam splitter 22, i.e., a beam splitter 25 which is contained within one or more optically transparent materials 27 which have a refractive index greater than air. By using an immersed beam splitter, light passes between the imaging surface 12 and the beamsplitting element 22 through a medium having a higher refractive index. The higher refractive index medium causes the source object projected from the imaging surface 12 to be magnified in comparison to an image of the source object which passes between the imaging surface 12 and the beamsplitting element 22 through air. The magnification performed by the beamsplitting element 22 enables a smaller beamsplitting element 22 to be used in the display system, which, in turn, enables the beamsplitting element 22 to be positioned at a tighter angle φ.

By reducing the angle φ at which the beamsplitting element 22 is positioned, the distance t between the first and second optical elements 24, 26 is reduced.

In one embodiment of the display, as illustrated in FIG. 1, the angle φ between the beam splitter 25 and plane 30 is between about 30 and 45°, in another embodiment, 37°. In another embodiment of the display system which utilizes total internal reflection within beamsplitting element 22, as illustrated in FIG. 2, the angle φ between the beam splitter 25 and plane 30 is between about 10 and 30°, in another embodiment, 25°. Thus, through the total internal reflection employed in the embodiment illustrated in FIG. 2, the angle φ between the beam splitter 25 and plane 30 and hence the separation required between the first and second optical elements 24, 26 is reduced.

The use of an immersed beam splitter also enables a smaller imaging surface 12 to be used and/or for the imaging surface 12 to be positioned further away from the beam splitter 25 than if the source object were projected from the imaging surface 12 to the beam splitter 25 through air. This is important to the compact design of the display system of the present invention since it enables the imaging surface to be positioned out from between optical elements 24, 26 and thus out of the field of view provided by the optical system.

Figure 3:
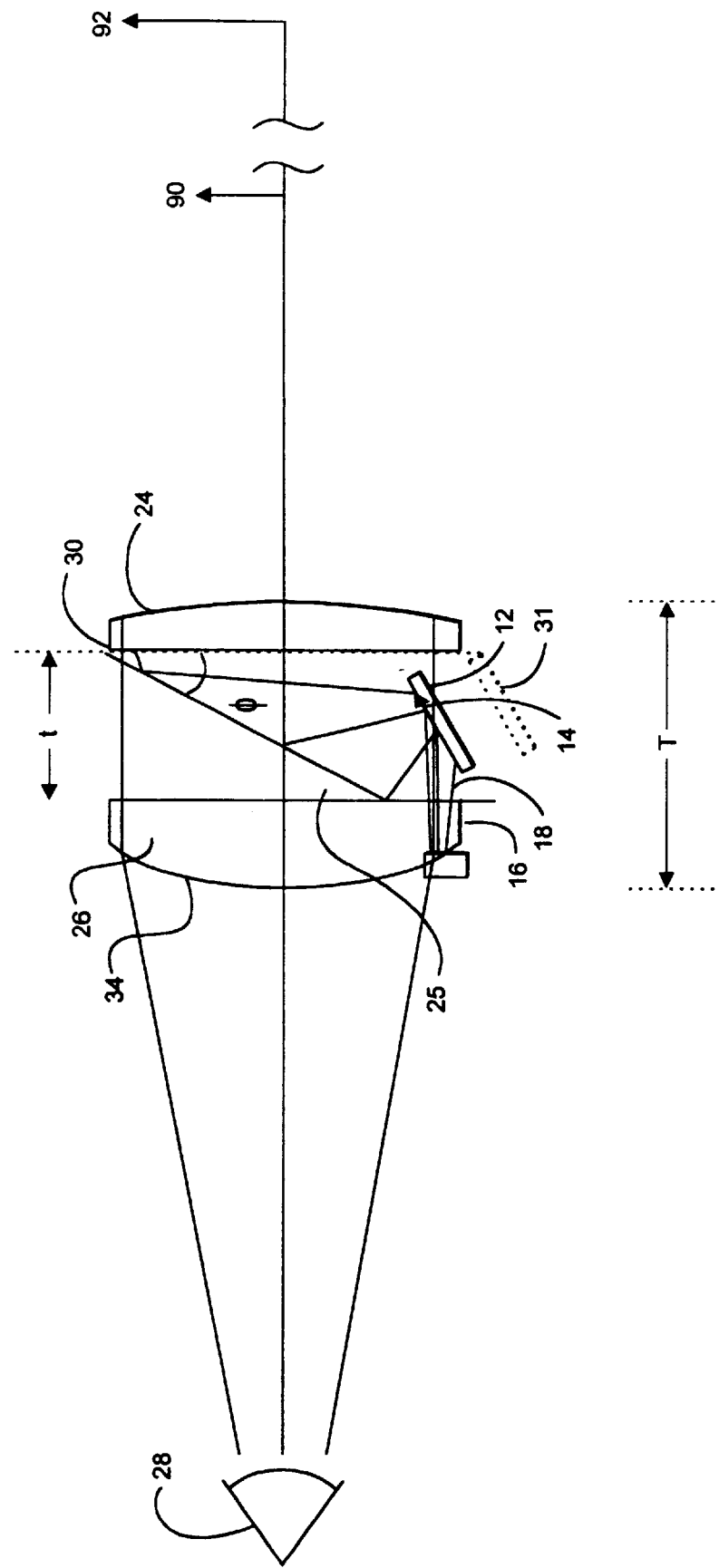
FIG. 3 illustrates a display system in which an immersed beam splitter is not used and the microdisplay is positioned in the field of view provided by the optical system.
Figure 4:
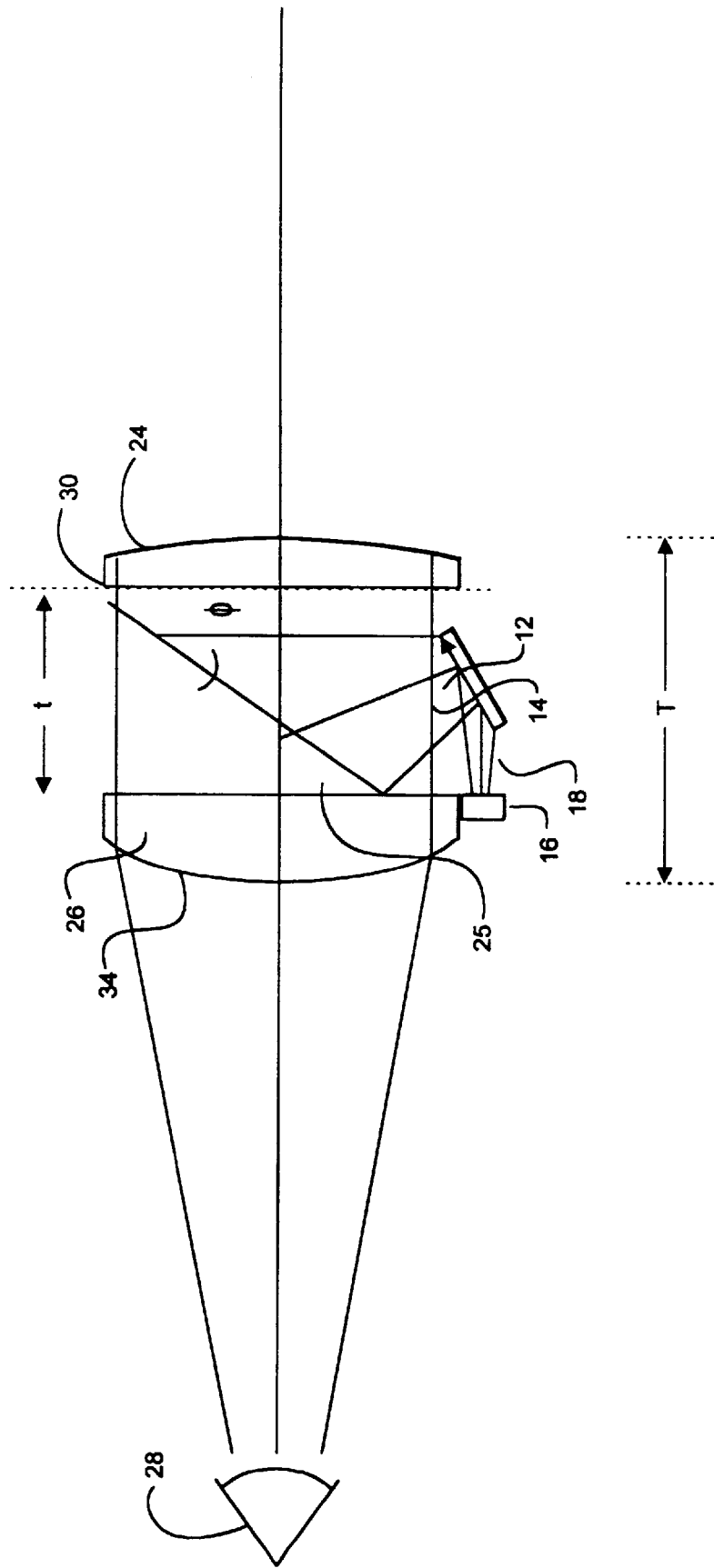
FIG. 4 illustrates a display system in which an immersed beam splitter is not used and the angle φ between the beam splitter and the optical elements is increased.

FIGS. 3-4 illustrate display systems having a layout similar to the display illustrated in FIG. 1 where the beam splitter 25 is not immersed in an optically transparent material 27 having a refractive index greater than air. As illustrated in FIG. 3, in order to create a first virtual image 90 of the source object 14 at a position approximately $f_1$ behind the second optical element 26, ($f_1$=the focal length of first optical element 24), the imaging surface must be moved closer to the first optical element 24 by a factor of $1/n_{imm}$ where $n_{imm}$ is the index of refraction of the immersing medium. This causes the imaging surface 12 to be positioned between optical elements 24, 26 and within the field of view provided by the optical system.

As illustrated in FIG. 4, when the beam splitter 25 is not immersed in an optically transparent material 27 having a refractive index greater than air, and when the imaging surface 12 is not brought closer to the first optical element 24, the magnification of the compound virtual image 92 relative to when an immersed beam splitter 22 is used is reduced by a factor of $1/n_{imm}$ where $1/n_{imm}$ is the refractive index of the immersing medium. In order to produce a compound virtual image 92 with an equivalent magnification relative to when an immersed beam splitter is used, it is necessary to use a larger imaging surface. This, however, has the disadvantage that it requires increasing the angle φ between the beam splitter 25 and the plane 30 of the first optical element, as illustrated in FIG. 4. This causes the separation t between optical elements 24, 26 to increase and thus the overall thickness T of the display system to increase relative to the display system illustrated in FIG. 1.

A variety of optically transparent materials may be used as the immersing medium 27 in beam splitting element 22 including glass and molded plastics, such as polymethyl methacrylate, polystyrene, polycarbonate, methyl methacrylate styrene, styrene acrylonitrile, and acrylonitrile butadiene styrene. In one embodiment, the optically transparent material 27 has refractive index of at least about 1.3.

The beam splitter 25 acts as both a reflective and transmissive optical element in the display system. In one embodiment, the beam splitter 25 simply reflects and transmits portions of the light directed to the beam splitter 25, typically approximately 50% reflective and 50% transmissive. These types of beam splitters should have a coating with a broader bandwidth than the illumination source. Types of coatings which may be used with this type of beam splitter include, but are not limited to, dielectric, metal/dielectric and metal coatings. Hybrid metal/dielectric coatings are preferred because they provide moderate light absorption with little polarization sensitivity. These coatings also show relative insensitivity to the angle of incidence.

In another embodiment, illustrated in FIGS. 5A–D, the beam splitting element 22 may include a beam splitter 25 immersed in a combination of two optically transparent materials which each have an index of refraction greater than air. In general, the first optically transparent material 51 is preferably well adapted to be coated with one of a variety of optical coatings which one of ordinary skill may wish to applied to one or more surfaces of the immersed beam splitting element. Glass is particularly preferably as the first optically transparent material due to the reduced cost associated with coating glass as compared to other materials, such as plastic.

In order to reduce the overall cost of beam splitting element, the second optically transparent material 61 is preferably a lower cost material than the first optically transparent material 51. For example, plastic or transparent liquids may be used as the second optically transparent material 61. The second optically transparent material may also be used to form the surface interfaces which are not formed of the first optically transparent material. By using these materials in combination, the cost of the immersed beam splitting element can be minimized.

According to this embodiment, a first optically transparent material 51 covers one or more of the surfaces of the immersed beam splitter 25 through which light within the display system enters and/or exits the immersed beam splitter 25. These surfaces include, but are not limited to the beam splitter surface 53 opposite the illumination source 16, the beam splitter surface 55 opposite the imaging surface 12, the beam splitter surface 57 opposite the first optical element 24, and the beam splitter surface 59 opposite the second optical element 26.

A variety of methodologies are known to one of ordinary skill in the art for forming a beam splitter having a combination of two optically transparent materials. For example, the first optically transparent material may be a glass slide which is glued to one or more surfaces of the second optically transparent material. The beam splitter may be incorporated into either the first or second optically transparent material in the beam splitting element.

Several embodiments of immersed beam splitting elements having a combination of two different optically transparent materials are illustrated in FIGS. 5A–D. It should be understood that these embodiment are not intended to be limiting as to the variety of immersed beam splitting elements that may be constructed using a combination of two or more optically transparent materials.

Figure 5A:
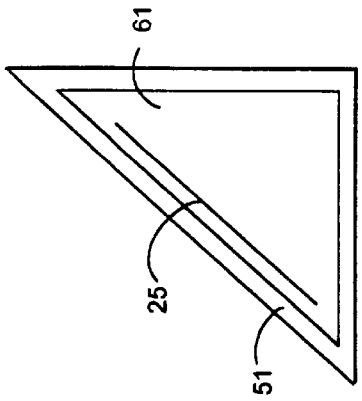
FIGS. 5A–D illustrate a series of immersed beam splitting elements formed of at least two different optically transparent materials.
Figure 5B:
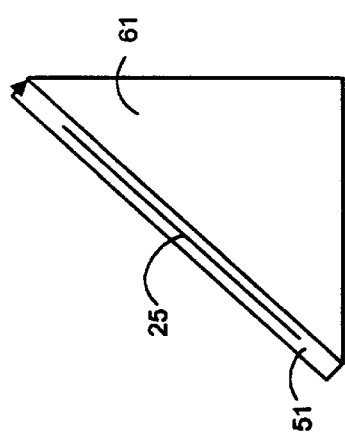
Figure 5C:
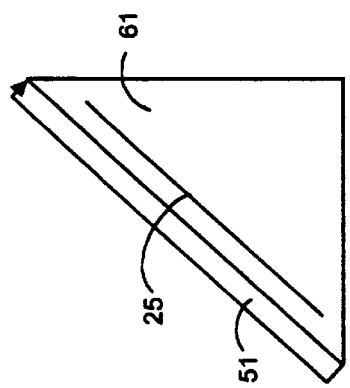
Figure 5D:
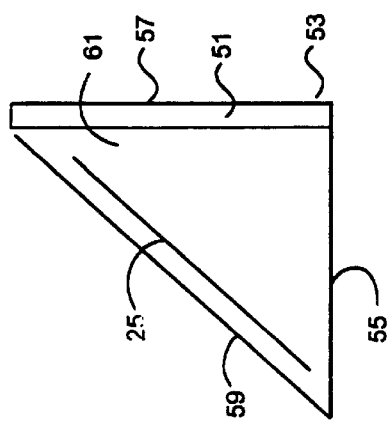

Illustrated in FIG. 5A is an immersed beam splitting element 22 formed of plastic 61 in which a glass slide 51 is positioned over surface 57 of the immersed beam splitting element 22 which faces the first optical element. Illustrated in FIG. 50 is an immersed beam splitting element 22 formed of plastic 61 in which a glass slide 51 is positioned over surface 59 of the immersed beam splitting element 22 which faces the second optical element 26. Illustrated in FIG. 5C is an immersed beam splitting element 22 formed of plastic 61 in which a glass slide 51 is positioned over surface 59 of the immersed beam splitting element 22 which faces the first optical element 24. In this embodiment, the beam splitter 25 is incorporated into the glass slide 51 as opposed to the plastic 61. Illustrated in FIG. 5D is an immersed beam splitting element 22 in which the entire surface of the element is covered by glass 51. In this embodiment, a volume is defined within the glass. Because the glass substantially surrounds the volume, this immersed beam splitting element design is well adapted for using a liquid as the second optically transparent material 61.

In another embodiment, a beam splitter 25 is used whose reflective and transmissive properties are polarization dependent, i.e., the beam splitter 25 is more highly reflective at one polarization of light and more highly transmissive at another polarization of light. When a 50:50 beam splitter is used, 75% of the light is lost in the display system of the present invention. However, by using a polarization dependent beam splitter in combination with a polarization modifier, light can be directed within the optical system without the loss of light associated with non-discriminant beam splitters.

Figure 6:
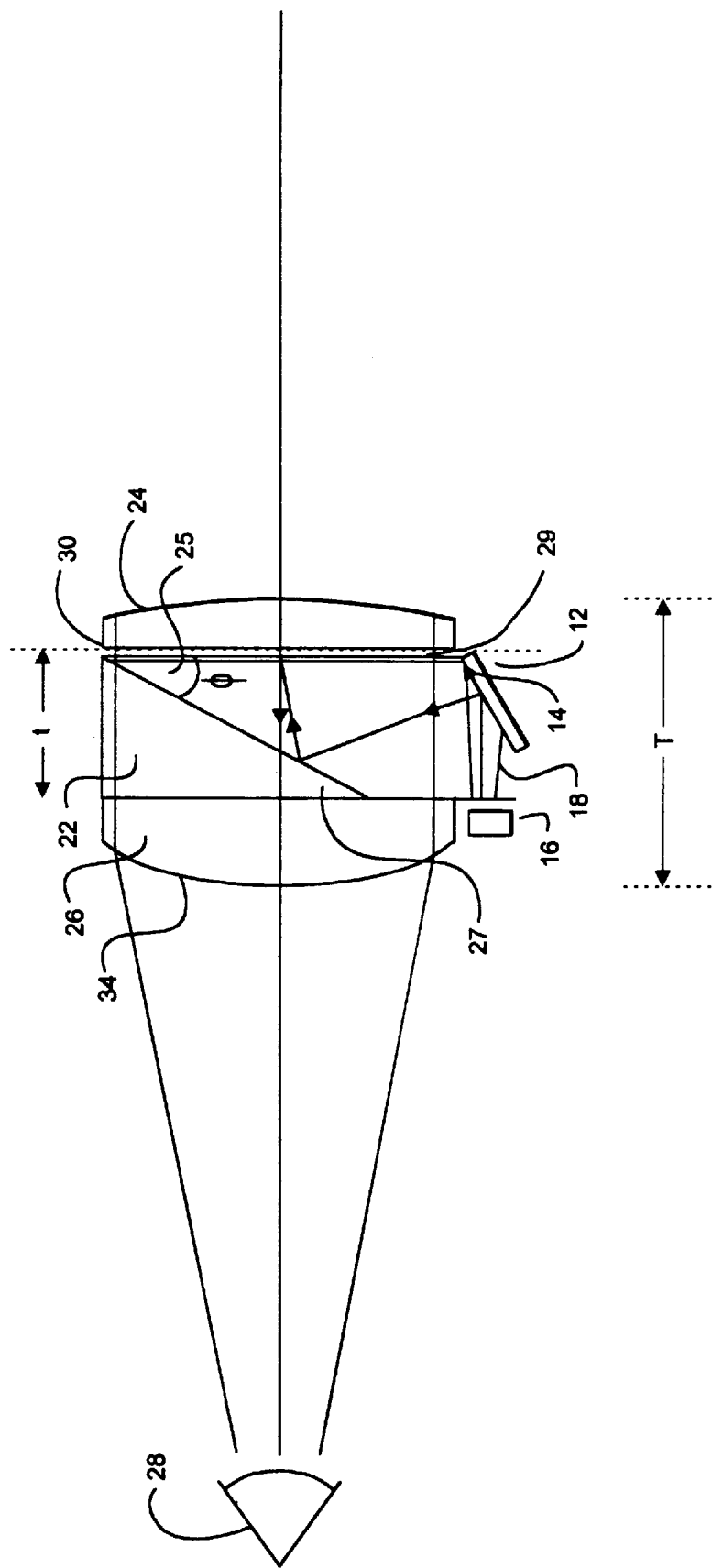
FIG. 6 illustrates a display system according to the present invention in which a polarization discriminating beam splitter is used.

As illustrated in FIG. 6, a polarization modifier 29, such as a quarter waveplate, is positioned between the beam splitter 25 and the reflective first optical element 24 in this embodiment. The polarization modifier 29 serves to alter the polarization of the light which traverses the polarization modifier before and after being reflected off the first optical element 24. By using the polarization modifier 29, polarized light from the microdisplay 12 is reflected by the beam splitter 25, altered as it traverses the polarization modifier 29, reflected by the first optical element 24 and altered again by the polarization modifier 29 so that the light traverses the beam splitter 25 after being reflected off the first optical element 24.

The position at which an individual is best able to focus on an object is dependent on that individual's vision. For example, some individuals are far sighted (hyperopic) and are better able to visualize image which appear to be positioned at a far distance. By contrast, other individuals are near sighted (myopic) and are better able to visualize image which appear to be positioned close to the eye. In order to accommodate these differences in the vision capabilities of potential users, an embodiment of the display system is provided in which the apparent position of the compound virtual image to the user can be varied. Adjustment to the apparent position of the compound virtual image to the user, also referred to herein as focusing, is accomplished by a mechanism which moves the first optical element 24 relative to the beam splitter 25.

Figure 7:
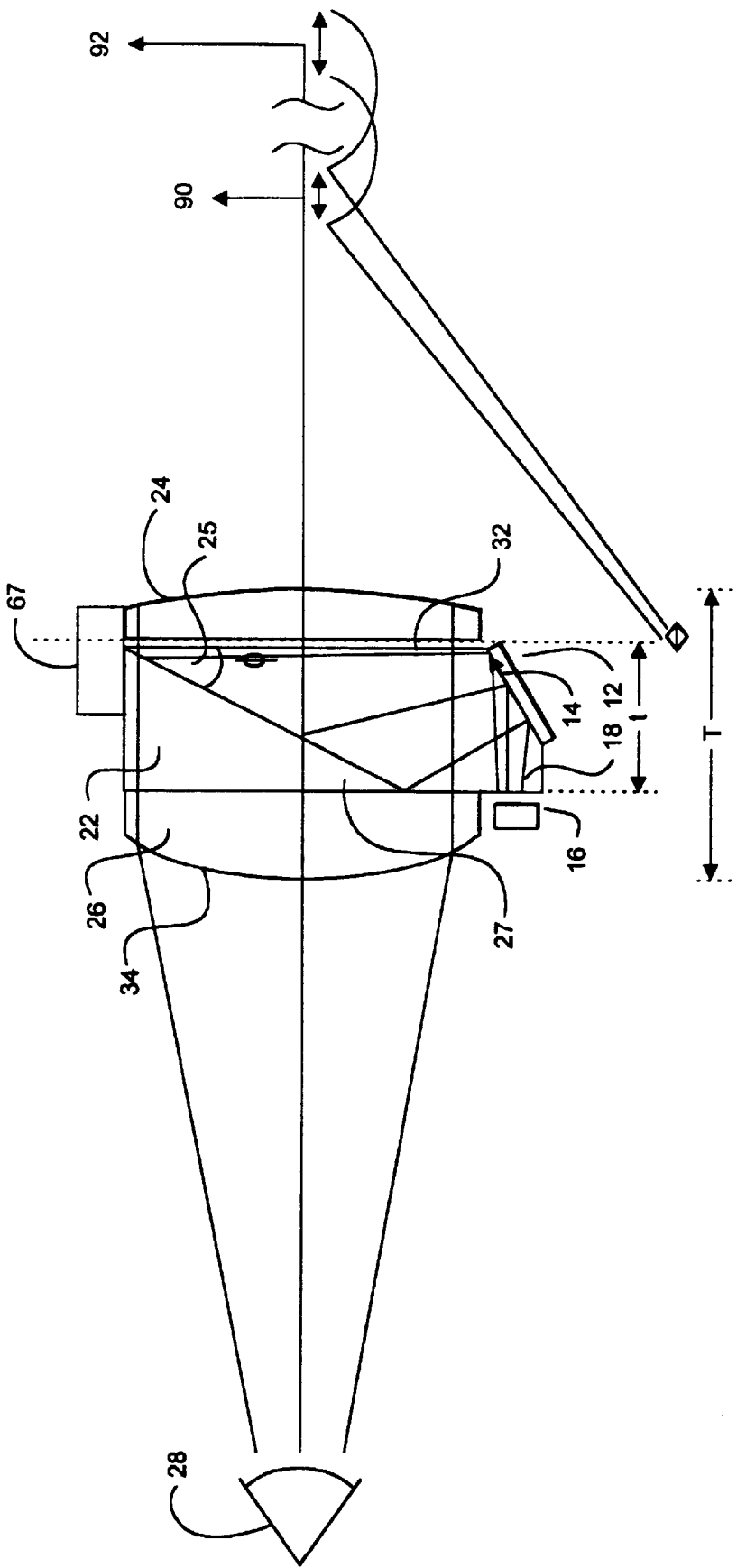
FIG. 7 illustrates a display system according to the present invention with a focusing mechanism.

As illustrated in FIG. 7, the first optical element 24 and/or second optical element 26 can be moved relative to the beam splitter 25 by a focusing mechanism 67. Movement of the first optical element 24 relative to the beam splitter 25 causes the compound magnified virtual image 92 to appear at different distances from the observer's eye. For example, the first optical element may be moved to make the compound magnified virtual image 92 appear at a position within several inches of the observer's eye to a position numerous feet from the observers eye. Movement of the second optical element 26 relative to the beam splitter 25 causes the first magnified virtual image 90 to appear to be at different distances relative to the observer. Due to the overall design of the optical system, this wide range focusing of the display system can be accomplished by small movements of the first optical element 24 and/or second optical element 26 relative to the beam splitter 25.

Table 1 provides data which indicates the perceived distance between a compound magnified virtual image ($d_{cmvi}$) and an observer for a series of separation distances ($d_{sep}$) between the source object and first optical element. In the display system upon which this data is based, the first optical element has a radius of 60 mm, the second optical element has a focal length of 60 mm and the index of refraction of the immersion medium is 1.5. As shown by the data in Table 1, at a separation distance of 27.5 mm, the compound magnified virtual image appears about 1.5 feet from the observer. However, by moving the first optical element 1.4 mm to a separation distance of 28.9 mm, the compound magnified-virual image appears to be about 79 feet from the observer. Thus, as can be seen from this data, only a s mall movement of the first optical element relative to the beam splitter causes the compound magnified virtual image to appear to move a significant distance relative to the observerp's eye.

TABLE 1

| $D_{sep}$ | $D_{cmvi}$ |
| --- | --- |
| 27.5 mm | 1.53 ft |
| 27.7 mm | 1.8 ft |
| 27.9 mm | 2.1 ft |
| 28.1 mm | 2.7 ft |
| 28.3 mm | 3.5 ft |
| 28.5 mm | 5.2 ft |
| 28.7 mm | 9.8 ft |
| 28.9 mm | 79 ft |

$D_{cmvi}$ distance between a compound magnified virtual image and an observer
$D_{sep}$ separation distances between the source object and first optical element The imaging surface 12 employed in the display system is used as a source of a source object which is projected to the beam splitting element 22. In its broadest sense, the imaging surface may be any surface or device on which a real image may be formed or generated. In one embodiment, the imaging surface is a microdisplay. The microdisplay may be any electronically activated display which can produce a source object of any type. For example, the microdisplay may be a liquid crystal display, a spatial light modulator, a grating, a mirror light valve or an LED array. More specific examples of microdisplays which may be used in the display system of the present invention include, but are not limited to light transmissive liquid crystal displays, cholesteric liquid crystal displays, PSC liquid crystal displays and spatial light modulators. In a preferred embodiment, the microdisplay is a light transmissive liquid crystal on silicon display.

According to one embodiment of the invention, the microdisplay has a display area of less than about 100 mm². In one embodiment, the microdisplay has pixels whose size is between about 49 $\mu$m² and about 225 $\mu$m². In another embodiment, the pixels are less than about 144 $\mu$m². At these pixel and display size ranges, the microdisplay has a comparable number of pixels to that of a high resolution computer monitor.

Any illumination source which provides light in the visible range may be used in the display system of the present invention. Examples of illumination sources which may be used in the present invention include, but are not limited to incandescent lamps, lasers and light emitting diodes.

Microdisplays may generally be divided into two categories, reflective and light transmissive displays. Reflective microdisplays form a source object by modulating which pixels reflect or scatter incident light. By contrast, light transmissive displays form a source object by modulating which pixels are transmissive or opaque. Accordingly, when the microdisplay is a light transmissive microdisplay, illumination is provided from the rear of the microdisplay. When the microdisplay is a reflective, illumination is provided so that the illumination is reflected off the imaging surface of the microdisplay toward the beam splitting element.

In one embodiment, the illumination source 16 used in the display system is designed in combination with the microdisplay such that light from the illumination source uniformly illuminates the source object formed by the microdisplay. By providing uniform illumination to the microdisplay, a virtual image is produced by the display system which is uniformly illuminated as the user's eye is moved within the field of view.

Depending on the microdisplay employed in the display system, different forms of illumination are particularly well adapted for providing uniform illumination. For example, for transmissive liquid crystal displays and cholesteric liquid crystal displays, it is preferred that the display be backlit on axis with the beam splitting element. For reflective special light modulators and PSC liquid crystal displays, it is preferred that the illumination be provided to the face of the display off axis, for example by a light emitting diode.

Figure 8:
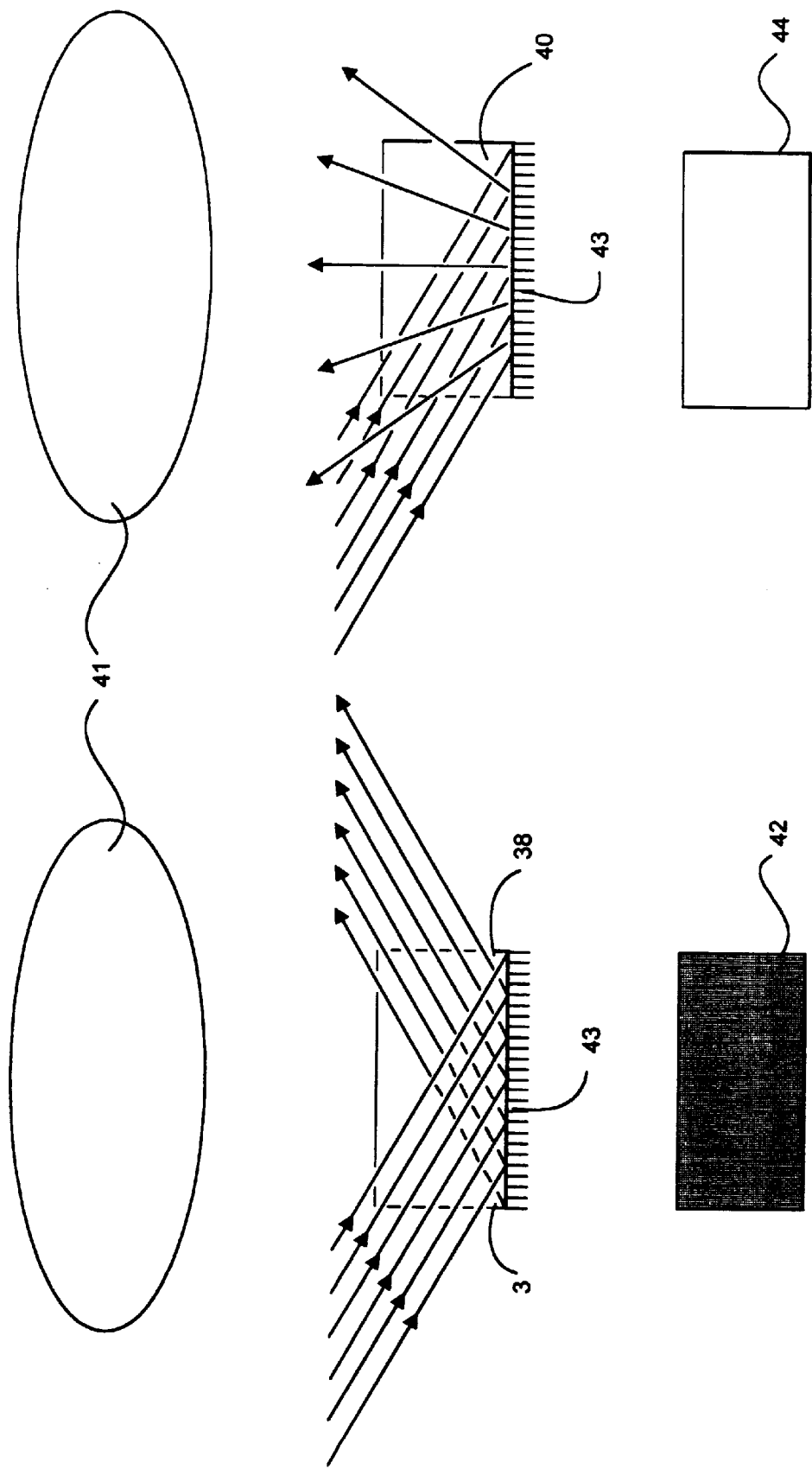
FIG. 8 illustrates the reflective and scatter modes of a liquid crystal display.

An illustration of an off-axis illumination system used in combination with a liquid crystal silicon display is provided in FIG. 8. As illustrated in the figure, the liquid crystal display includes pixel 37 which can be modulated between two modes 38, 40. The first mode 38 is a reflective mode where light incident on the liquid crystal display traverses the pixel and is reflected off of a reflective surface 43 underlying the pixel 37 in a direction away from the optical system 41. Light which is reflected by a pixel in a reflective mode does not enter the optical system 41 and reach the user's eye. As a result, pixels in a reflective mode appear dark 42 to the user. The second mode 40 is a scatter mode where light incident on the liquid crystal display is scattered by the display in all directions. A portion of the light that is scattered in the scatter mode enters the optical system 41 and reaches the user's eye. As a result, pixels in the scatter mode appear bright 44 to the user.

Figure 9:
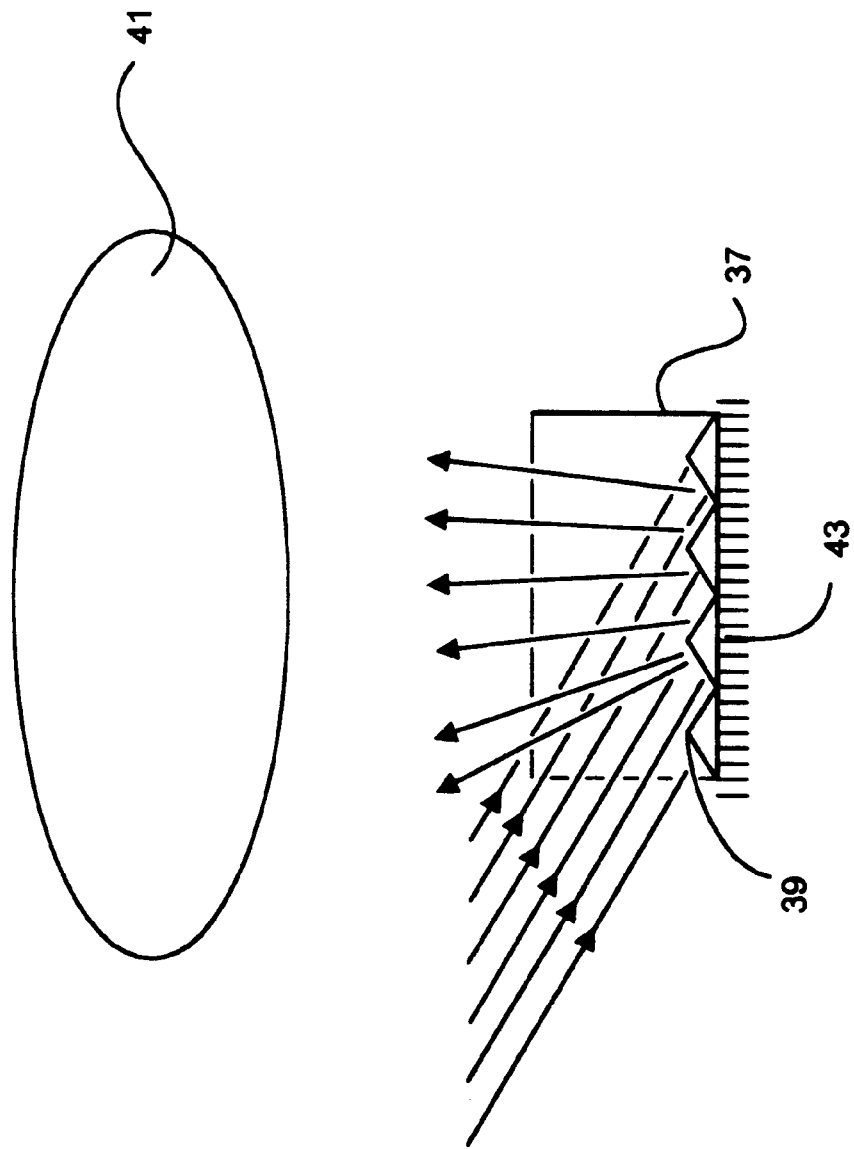
FIG. 9 illustrates a liquid crystal display with a grating for focusing scattered light into the optical system.

FIG. 9 illustrates an alternate embodiment of the display system in which an optical grating is used to focus light scattered by a microdisplay pixel into the field of view of the display. As illustrated in FIG. 9, the liquid crystal display includes an optical grating 39 covering the reflective surface 43 underlying each pixel 37. The grating 39 serves to focus light which traverses the microdisplay to the reflective surface in the direction of the optical system 41. As a result, more of the light scattered by a pixel in a scatter mode is directed through the optical system to the user. Since more scattered light reaches the user when a grating 39 is used, the images produced by the display system of FIG. 9 are brighter than images produced by the display system illustrated in FIG. 8.

Figure 10:
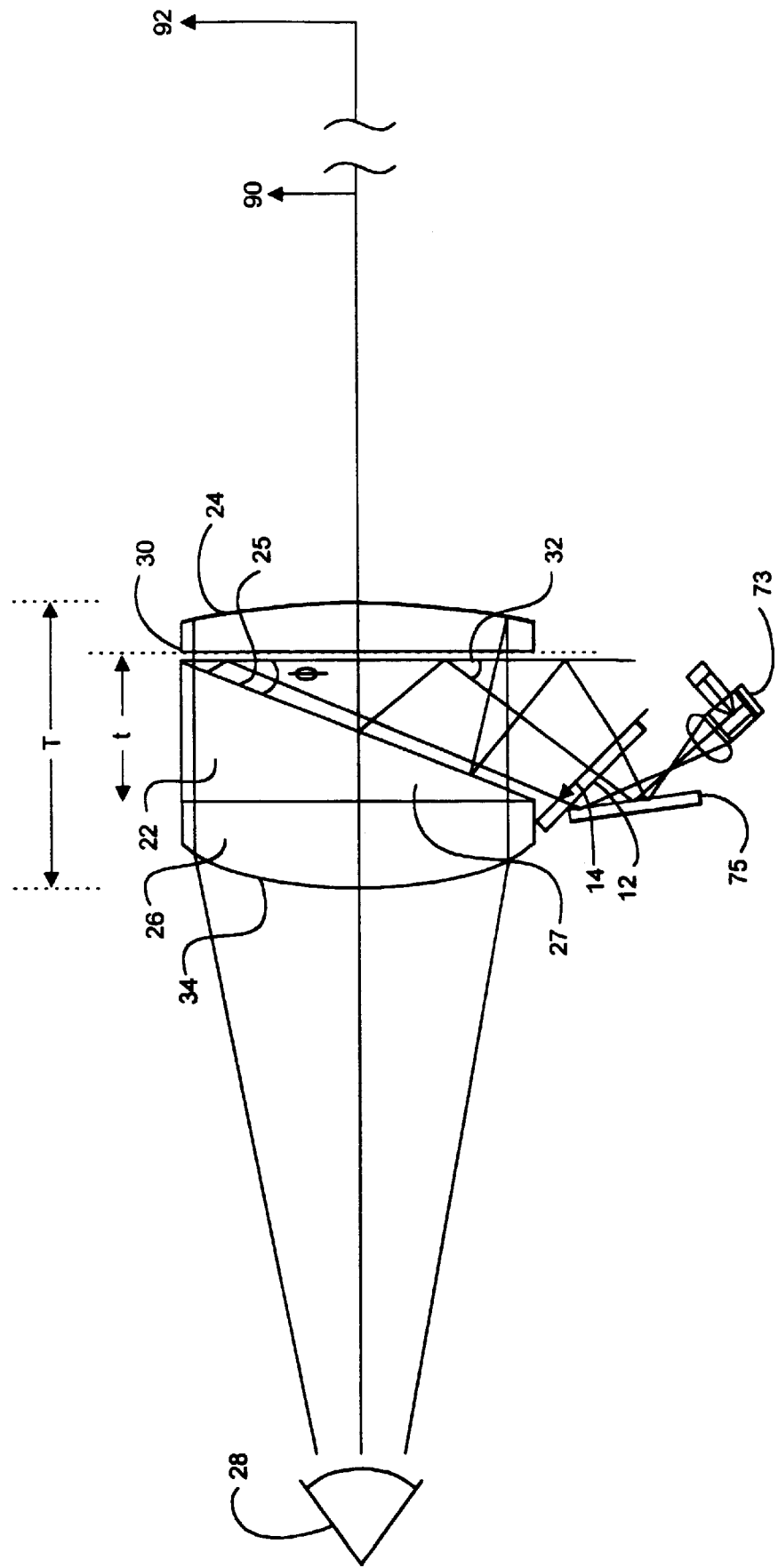
FIG. 10 illustrates a display system in which the imaging surface is a screen on which a real image is formed.

The imaging surface may also be a surface on which a real image is formed. As illustrated in FIG. 10, the display system includes a real image generating mechanism 73 which projects an image reflect off mirror 75 onto the imaging surface 12 which serves as the source object 14 for the display system. The real image generating mechanism 73 may include, for example, a microdisplay as described above, which forms the image, as well as optics which project and, optionally, magnify the image.

As illustrated in FIG. 10, the imaging surface 12 may be a light transmissive screen onto which a real image (the source object) is formed. It should also be understood that the imaging surface may be a reflective screen onto which a real image (the source object) is formed where light corresponding to the source object is reflected toward the beam splitting element 22.

The first and second optical elements 24, 26 used in the display system of the present invention are selected such that the optics are complementary to each other so that they cancel out many of the aberrations introduced by each optic independently. As a result, the combined magnified virtual image produced by the first and second optics is substantially free of aberrations. Depending on the optical correction which is needed, the first and second optical elements 24, 26 may have spherical or aspherical surfaces. Examples of aberrations which can be corrected by the pairing of first and second optical elements 24, 26 include, but are not limited to field curvature, coma, astigmatism and distortion.

The first and second optical elements 24, 26 may be made from a variety of materials including glass and plastic. Due to cost considerations, the optics are preferably formed of a molded plastic. A variety of different optical designs may be employed in the first and second optical elements. For example, the optical elements may each be formed of a single optic or multiple optical elements. The magnification function of each optic may be performed using a variety of different lens designs, including, but not limited to a fresnel lens, a holographic lens or a diffractive optical lens. In one embodiment, a HR coating at illumination wavelengths is used on the first optical element to provide the optic with a reflective function. In one embodiment, the first optical element 24 provides magnification by a factor of between about 5 and 10, in another embodiment by a factor of about 6. In one embodiment, the second optical element 26 provides magnification by a factor of between about 2 and 5, in another embodiment by a factor of about 3.

Figure 11:
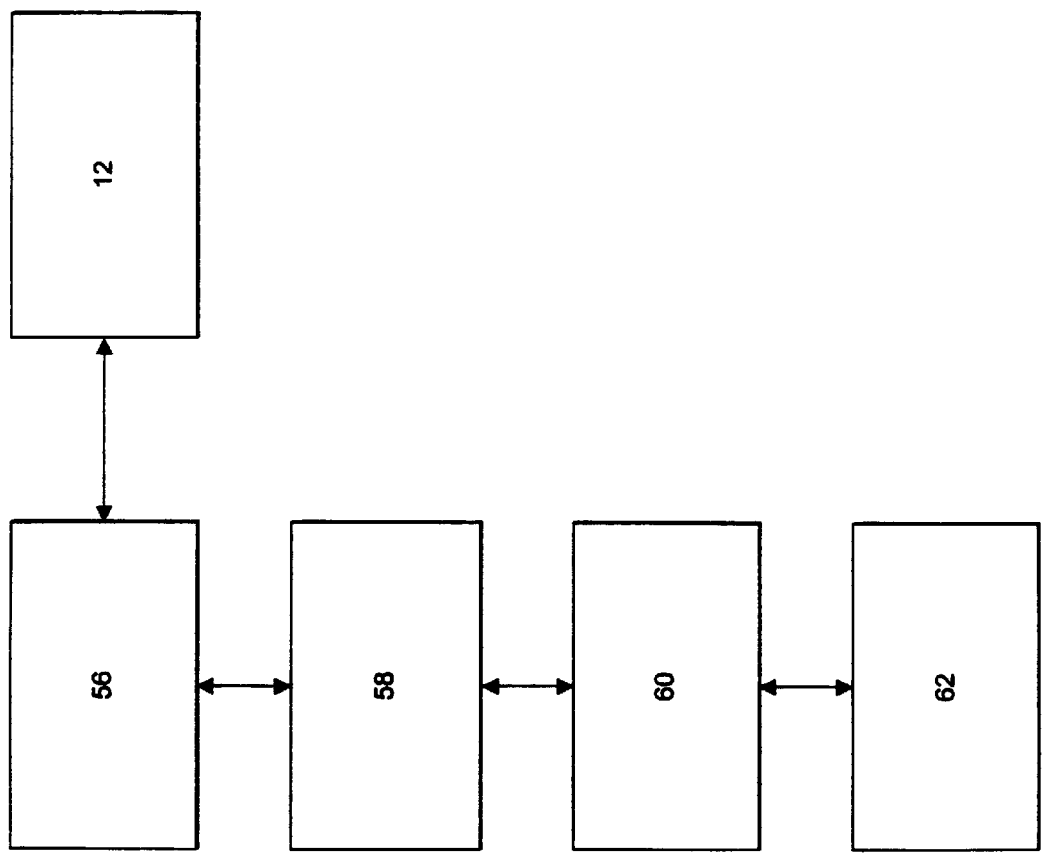
FIG. 11 illustrates the electronics included within the display system for controlling the microdisplay.

FIG. 11 illustrates the electronics included within the display system for controlling a microdisplay serving as the imaging surface. As illustrated in FIG. 11, the microdisplay 12 is connected to the control device 56 and conveys electrical signals to the microdisplay which controls the source object generated. The control device 56 may also be connected to a logic processor 58 which is also connected to external memory 60 which may be controlled through an external data source 62. In a preferred embodiment, the pixels of the microdisplay 12 are addressed by binary inputs which cause the pixels to be modulated between on and off states. The microdisplay 12 is connected to a control device 56 such as a character generator with timing and decoding logic. An example of a control device 56 suitable for use in systems according to the present invention is illustrated in FIG. 11. A commercially available example of a suitable control device is the VGA Controller, Product No. SPC8108F$_{oc}$ sold by SMOS.

The control device 56 is controlled by a processor 58 which manipulates the data from the external memory 60. The external memory receives the information from the external data source 62 such as an external radio receiver. The external data source 62 could also be an infrared diode data link to another computer, LAN system, or any other device capable of sending analog or digital communications. In a preferred embodiment, the external memory 60 and external data source 62 is a separate PCMCIA card which can be connected to a computer or communication system.

In a further, preferred embodiment, the display system includes an eye position sensor system. The sensor system enables the user to use his or her eye to interact with a control device. The eye position sensor system can be used by the user to control the images provided by the display. The eye position sensor system can also be used to control a variety of functions performed by the electronic device, for example, directing a printer to print a document or directing a facsimile machine to send a message. According to this embodiment, the position of the observer's eye is detected and used, much like a cursor, to interact with the controlling device to control the source object produced by the microdisplay.

Devices, such as eye trackers and occulometers, for detecting the position of the eye, are well known in the art. For example, suitable devices which may be used in conjunction with the virtual mouse sensor system include the device described in U.S. Pat. No. 4,513,317 which is incorporated herein by reference.

Figure 12:
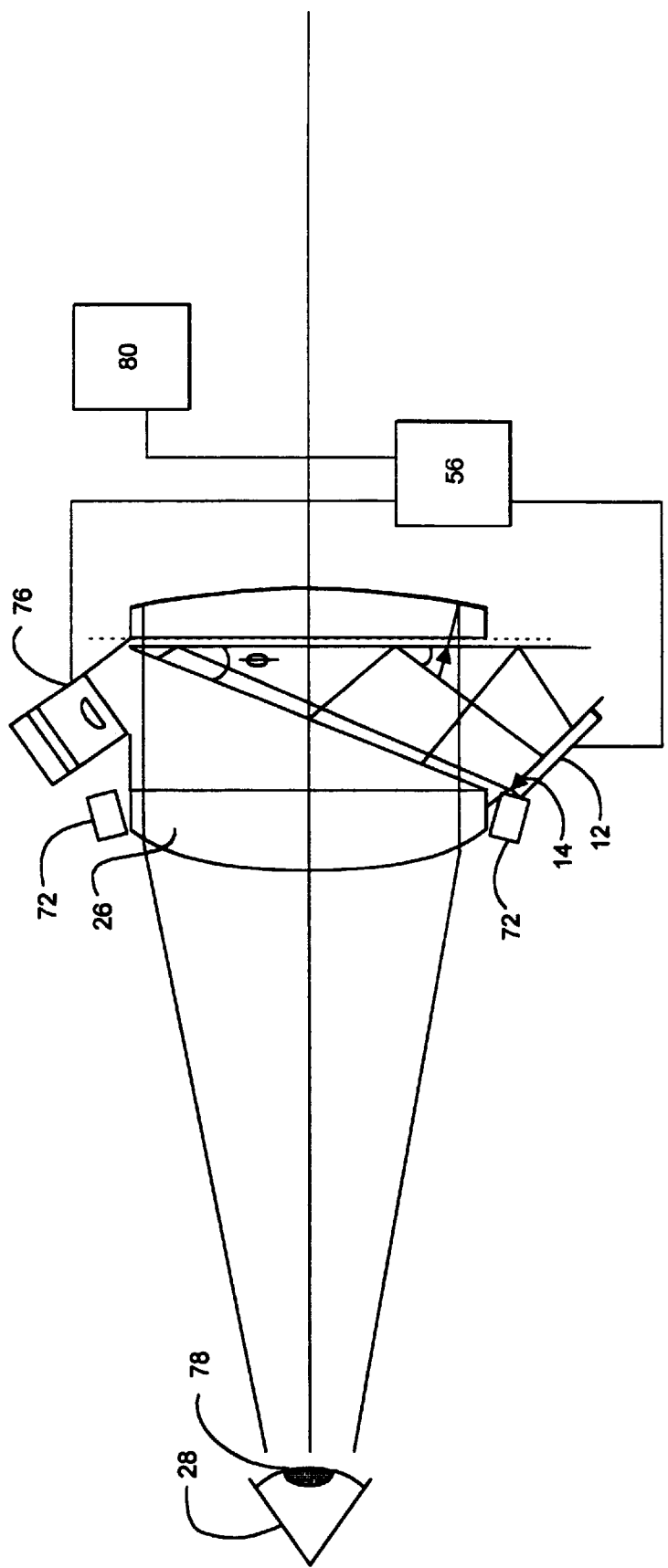
FIG. 12 illustrates an eye position sensor system used in conjunction with the display system of the present invention.

In one embodiment, illustrated in FIG. 12, the eye position sensor system includes a light emitting diode (LED) 72 which may be positioned around the perimeter of the second optical element 26 for providing illumination in the direction of the user's eye 28. The illumination is preferably in the infrared region. The eye position sensor system also includes a detector array 76 for detecting reflections of the illumination from the LED 72 off of the retina 78 of the eye 28, the reflections serving to indicate the position of the eye 28 as well as the direction of the eye. The eye position sensor system may also include a control mechanism 80 which the observer uses in combination with the detector array 76 to interact with the control device 56 to control the source object 14 produced by the microdisplay 12.

The control mechanism 80 may be, for example, a button which the user depresses to indicate that the observer is looking at a selected item, such as a computer software icon. The control mechanism 80 may also be a timing mechanism which determines that the user has selected an item based on the amount of time that the observer is looking in a particular direction.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An optical method comprising:
    (a) directing a source object within a first optical element to a surface of the first optical element where the source object is internally reflected;
    (b) directing the source object to a beamsplitter which reflects the source object;
    (c) directing the source object to a second optical element which magnifies and reflects the source object to form a magnified virtual image of the source object;
    (d) directing the magnified virtual image through the beamsplitter;
    (e) directing the magnified virtual image to a third optical element which magnifies the magnified virtual image to produce a compound magnified virtual image of the source object.

2. The optical method according to claim 1, the method further including forming the source object using a microdisplay.

3. The optical method according to claim 2, wherein the microdisplay has a display area of less than about 10 mm×10 mm.

4. The optical method according to claim 2, wherein the microdisplay has pixels having a size between about 7 $\mu$m×7 $\mu$m and about 15 $\mu$m×15 $\mu$m.

5. The optical method according to claim 2, wherein the microdisplay has pixels having a size less than about 12 $\mu$m×12 $\mu$m.

6. The optical method according to claim 1, wherein the first optical element is formed of an optically transparent material which has a refractive index of at least about 1.3.

7. The optical method according to claim 1, wherein the source object is directed to the internally reflecting surface of the first optical element at an angle of at least about 30°.

8. An optical method comprising:
    (a) directing a source object within a first optical element to a surface of the first optical element where the source object is internally reflected;
    (b) directing the source object within the first optical element to a beamsplitter which reflects the source object;
    (c) directing the source object within the first optical element to a surface of the first optical element which magnifies and reflects the source object to form a magnified virtual image of the source object;
    (d) directing the magnified virtual image through the beamsplitter out of the first optical element;
    (e) directing the magnified virtual image to a second optical element which magnifies the magnified virtual image to produce a compound magnified virtual image of the source object.

9. The optical method according to claim 8, the method further including forming the source object using a microdisplay.

10. The optical method according to claim 9, wherein the microdisplay has a display area of less than about 10 mm×10 mm.

11. The optical method according to claim 9, wherein the microdisplay has pixels having a size between about 7 μm×7 μm and about 15 μm×15 μm.

12. The optical method according to claim 9, wherein the microdisplay has pixels having a size less than about 12 μm×12 μm.

13. The optical method according to claim 8, wherein the first optical element is formed of an optically transparent material which has a refractive index of at least about 1.3.

14. The optical method according to claim 8, wherein the source object is directed to the internally reflecting surface of the first optical element at an angle of at least about 30°.

* * * * *